United States Patent
Koyanagi et al.

(10) Patent No.: US 8,386,635 B2
(45) Date of Patent: Feb. 26, 2013

(54) DATA COMMUNICATION SYSTEM CAPABLE OF ADJUSTING TRANSMISSION SPEEDS

(75) Inventors: Kenichiro Koyanagi, Kawasaki (JP); Norio Murakami, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1042 days.

(21) Appl. No.: 11/077,215

(22) Filed: Mar. 11, 2005

(65) Prior Publication Data

US 2006/0168310 A1    Jul. 27, 2006

(30) Foreign Application Priority Data

Dec. 3, 2004   (JP) ................................. 2004-350638

(51) Int. Cl.
    *G06F 15/16* (2006.01)
(52) U.S. Cl. ........................................ 709/233
(58) Field of Classification Search .............. 709/232, 709/233
    See application file for complete search history.

(56) References Cited

U.S. PATENT DOCUMENTS

| | | | | |
|---|---|---|---|---|
| 4,991,184 | A * | 2/1991 | Hashimoto | 375/219 |
| 5,534,929 | A * | 7/1996 | Tanaka | 375/240.03 |
| 5,751,440 | A * | 5/1998 | Nitta et al. | 358/434 |
| 5,859,875 | A * | 1/1999 | Kato et al. | 375/267 |
| 6,084,861 | A * | 7/2000 | Kato et al. | 370/280 |
| 6,208,619 | B1 * | 3/2001 | Takeuchi | 370/229 |
| 6,275,896 | B1 * | 8/2001 | Kojima | 711/112 |
| 6,658,485 | B1 * | 12/2003 | Baber et al. | 719/314 |
| 7,016,970 | B2 * | 3/2006 | Harumoto et al. | 709/233 |
| 7,092,192 | B1 * | 8/2006 | Yoshihiro | 360/73.06 |
| 8,149,802 | B2 * | 4/2012 | Lou et al. | 370/338 |
| 2002/0004840 | A1 | 1/2002 | Harumoto et al. | |
| 2002/0012350 | A1 * | 1/2002 | Mizukoshi | 370/394 |
| 2003/0140159 | A1 * | 7/2003 | Campbell et al. | 709/231 |
| 2004/0057378 | A1 | 3/2004 | Gronberg | |
| 2004/0203774 | A1 * | 10/2004 | Nagato et al. | 455/435.1 |
| 2005/0021827 | A1 * | 1/2005 | Matsuura | 709/232 |
| 2005/0055456 | A1 * | 3/2005 | Chalupsky et al. | 709/233 |
| 2005/0141421 | A1 * | 6/2005 | Ishii et al. | 370/230 |
| 2007/0047577 | A1 * | 3/2007 | Imai et al. | 370/466 |

FOREIGN PATENT DOCUMENTS

| | | |
|---|---|---|
| EP | 1 411 683 A2 | 4/2004 |
| JP | 2002-236641 | 8/2002 |

* cited by examiner

*Primary Examiner* — Jason Recek
(74) *Attorney, Agent, or Firm* — Smith, Gambrell & Russell, LLP (57) ABSTRACT

A communication system is disclosed, including: a network in which the transmission speeds of a upstream channel and a downstream channel for transmitting data can be changed independently; a data storage server connected to the network, the data storage server configured to store data uploaded thereto via the network; and a communication terminal connected to the network, the communication terminal configured to upload old data stored therein to the data storage server via the network thereby to move the old data to the data storage server, and download new data via the network thereby to store the new data therein. The communication terminal is further configured to request the network to change at least one of the transmission speeds of the upstream channel and the downstream channel based on remaining memory capacity thereof and the transmission speeds such that there remains memory capacity available for the new data.

6 Claims, 9 Drawing Sheets

DATA COMMUNICATION SYSTEM CAPABLE OF ADJUSTING TRANSMISSION SPEEDS

BACKGROUND OF THE INVENTION

1. Field of the Invention

The present invention generally relates to data communication, and more particularly, to a data communication system in which data is exchanged via a network and a data communication terminal that can transmit/receive data and store the data.

2. Description of the Related Art

As demand for data communication increases, more data are transmitted at higher speeds via networks. Especially, data communication via mobile communication systems is rapidly developing. Users of multifunctional mobile communication terminals download a large amount of data such as music, motion picture, and application programs and store the downloaded data into their mobile terminals. Communication terminals are usually provided with large memory capacities.

However, the memory capacity of a communication terminal may not be large enough, and especially, the memory capacity of a mobile communication terminal may be still limited in order to reduce its weight, for example. When new data are to be stored in a communication terminal, the communication terminal may not have sufficient memory available for the new data.

While storing the new data in a memory, the communication terminal may determine that no memory area remains in the memory. In such a case, there may be the following options:
(a) the communication terminal continues storing the new data overwriting old data stored in the memory; and
(b) the communication terminal discontinues storing the new data leaving the old data as is.

If the communication terminal determines that the remaining memory capacity available for the new data is not sufficient before the communication terminal starts storing the new data, there may be the following options:
(c) the communication terminal deletes old data stored in the memory and secures memory area for the new data to be stored;
(d) the communication terminal moves the old data stored in the memory to a secondary memory to secure memory area for the new data to be stored; and
(e) the communication terminal sends the old data stored in the memory to a data storage server via the network to secure memory area for the new data to be stored.

In the case of a mobile communication terminal, because a user may not carry such a secondary memory with her, it is probable that the user uses the data storage server connected to the network.

Figure 7:
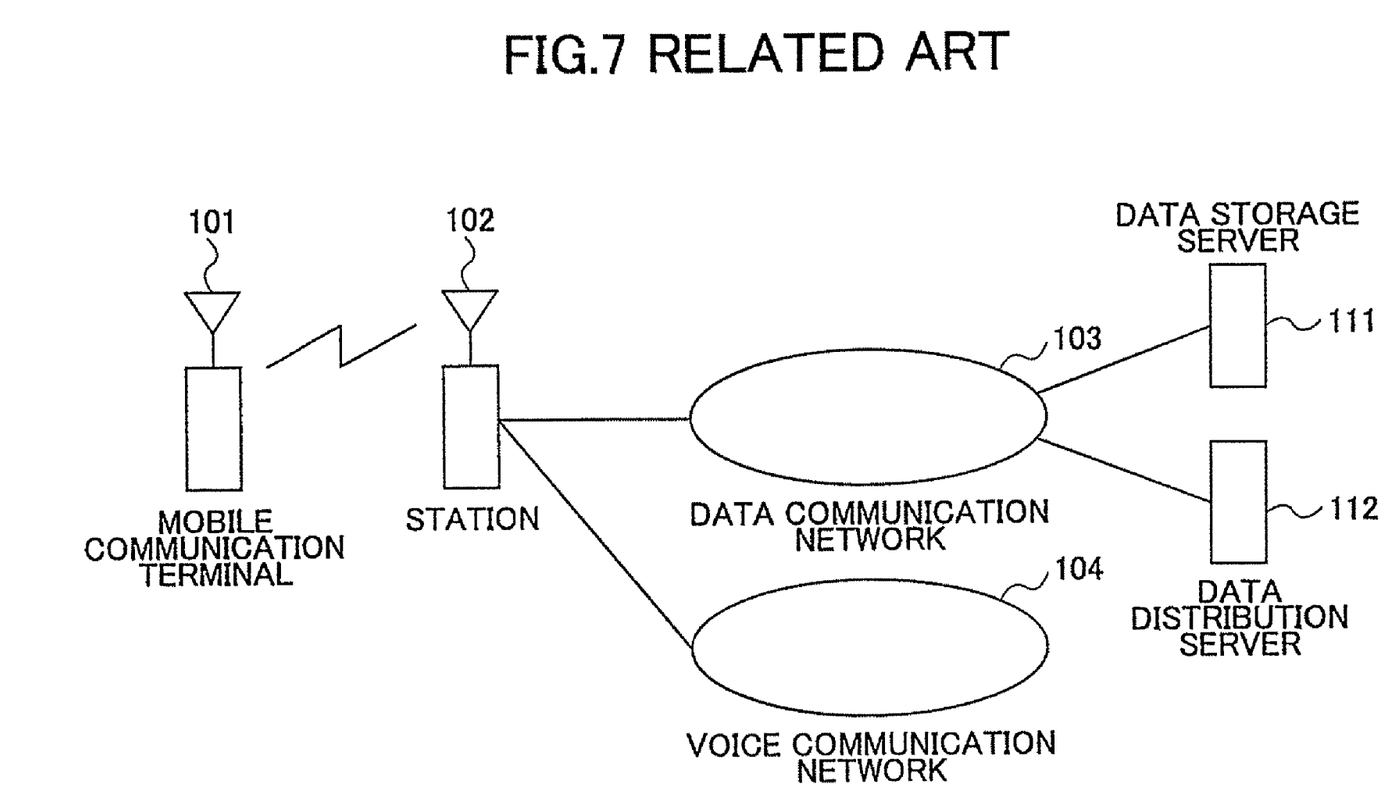
FIG. 7 is a system diagram showing a mobile communication system.

FIG. 7 is a schematic diagram showing an exemplary data communication system. The data communication system shown in FIG. 7 includes a mobile communication terminal 101, a station 102, a data communication network 103, a voice communication network 104, a data storage server 111, and a data distribution server 112. The mobile communication terminal 101 is connected to the station 102 via a radio channel. The station 102 is connected to the data communication network 103 via a wired channel. The station 102 is also connected to the voice communication network 104 via a wired channel. The access method between the mobile communication terminal 101 and the station 102 may be frequency division multiple access (FDMA), time division multiple access (TDMA), or code division multiple access (CDMA), for example. Transmission speed of a mobile communication terminal can generally be defined by the number of frequency channel (in the case of FDMA), the number of time slots (in the case of TDMA), and the number of spreading codes or spreading factor (in the case of CDMA).

The station 102 is positioned between the mobile communication terminal 101 and the data communication network 103 and between the mobile communication terminal 101 and the voice communication network 104. The station 102 converts and translates radio communication signals to wired communication signal, and vice versa. The station 102 further controls radio channels and wired channels. That is, the station 102 can assign a frequency channel, a time slot, or a spreading code to the mobile communication terminal 101 in accordance with the communication method between the communication terminal and the station. Data is transmitted through the data communication network 103, while voice signals are transmitted through the voice communication network 104. An example of the data communication network 103 includes the Internet and a local area network (LAN). Multiple communication terminals and multiple servers can be connected to the data communication network 103. The data storage server 111 and the data distribution server 112 are examples of the multiple servers connected to the data communication network 103.

Figure 8:
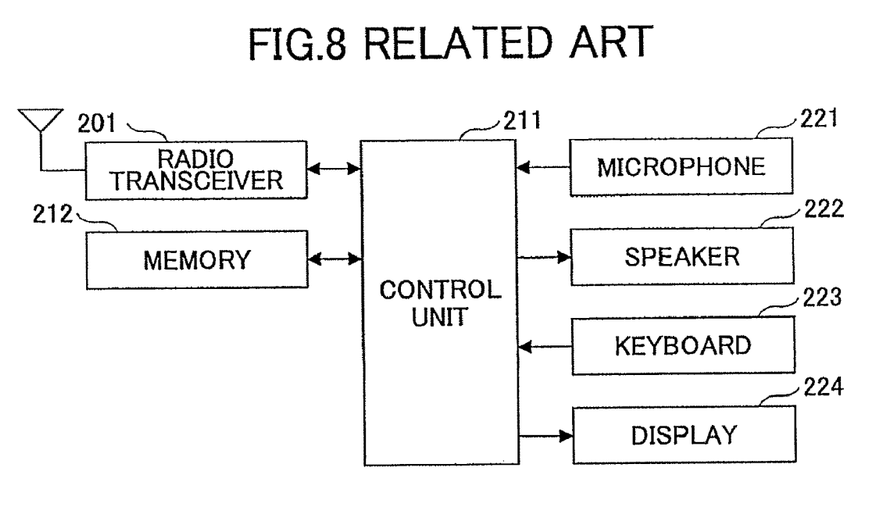
FIG. 8 is a block diagram showing a conventional communication terminal.

FIG. 8 is a block diagram showing a conventional mobile communication terminal. The mobile communication terminal 101 includes a radio transceiver 201, a control unit 211, a memory unit 212, a microphone 221, a speaker 222, a keyboard 223, and a display unit 224. The mobile communication terminal 101 may further include a digital camera unit (not shown) and a radio/television broadcasting receiver unit (not shown).

The control unit 211 controls the entire system of the mobile communication terminal 101. The radio transceiver 201 receives the data and the voice signal transmitted through the data communication network 103 and the voice communication network 104 via the station 102. The received voice signal is output from the speaker 222, and the received data is stored in the memory unit 212. Voice input to the microphone 221 is converted into a voice signal, and the voice signal is transmitted to the voice communication network 104 through the radio transceiver 201. Similarly, data stored in the memory unit 212 can be displayed on the display unit 224, or transmitted to the data storage server 111, for example, via the data communication network 103.

Figure 9:
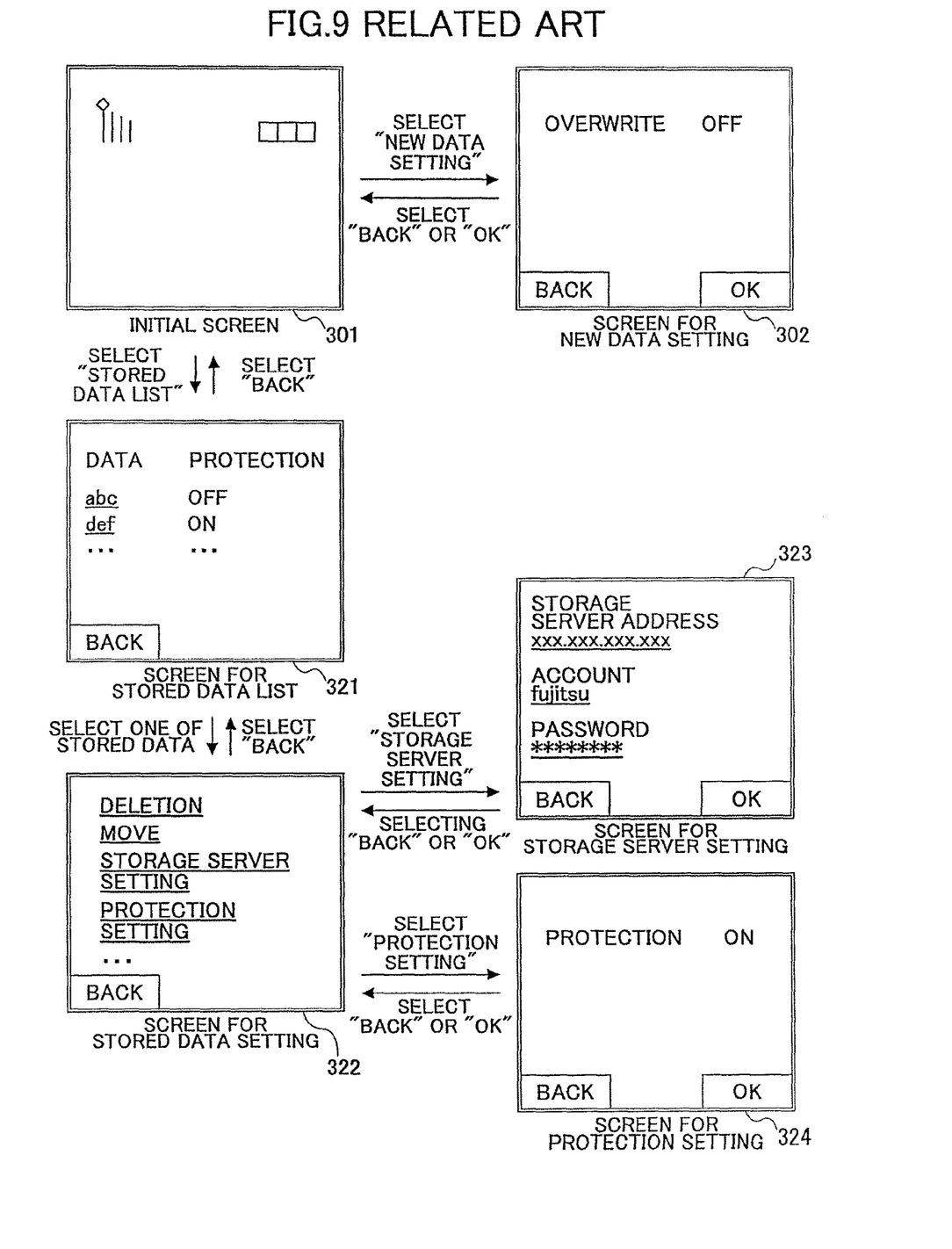
FIG. 9 is a schematic diagram showing the transition of screens of a conventional communication terminal.

FIG. 9 is a schematic diagram for explaining the transition of screens shown on the display unit 224 of the mobile conventional communication terminal 101. In an initial state, a user can use the keyboard 223 and the display unit 224 to input data or select options regarding new data stored from now on or old data stored in the memory unit 212. When the user selects "NEW DATA SETTING" while the initial screen is shown on the display unit 224, a screen for new data setting 302 is shown on the display unit 224. Using the screen for new data setting 302, the user can set "OVERWRITE" ON, which means that, if memory capacity becomes insufficient while storing new data in the memory unit 212, it is not suspended, and the old data stored in the memory unit 212 is overwritten with the new data. If "OVERWRITE" is OFF, it is suspended without overwriting the old data when the memory capacity of the memory unit 212 is exhausted.

On the other hand, when the user selects "STORED DATA LIST" using the keyboard 223, a screen showing stored data list 321 is shown on the display unit 224, where the user can input various parameters and/or select options. For example, the user can designate a data storage server 111 (FIG. 7) to which the user move data stored in the memory unit 212 while a screen for storage server setting 323 is displayed on the display unit 224. According to an embodiment, the data storage server 111 may require prior registration of the user and the input of appropriate account name and password by the user. The user can select a single data storage server 111 in which all data stored in the memory unit 212 is stored in common, whereas different data stored in the memory unit 212 may be stored in different data storage servers (not shown).

When the user selects "PROTECTION SETTING" while the screen for stored data setting 322 is displayed, a screen for protection setting 324 is displayed on the display unit 224. The user can turn "PROTECTION" ON and OFF, which means that the data stored in the memory unit 212 is protected or not, respectively, when new data is stored and the old data stored in the memory unit 212 is overwritten. These settings are also stored in the memory unit 212.

If the user permits to overwrite the old data stored in the memory unit 212 with the new data, the user turns "OVERWRITE" ON. If the user does not want some of the old data stored in the memory unit 212 to be overwritten, the user can set "PROTECTION" ON in the screen for protection setting 324, which leads that the old data with "PROTECTION" ON is not overwritten even if the other old data is overwritten. If all of the old data stored in the memory unit 212 is set "PROTECTION" ON, and the memory capacity available for the new data is exhausted, it is suspended to store the new data. If some of the old data stored in the memory unit 212 is not set "PROTECTION" ON, and the memory capacity of the memory unit 212 available for the new data is exhausted, the oldest item, the least frequently accessed item, or the most previous item of the stored data may be selectively overwritten. The user can implement such settings manually, or the setting may be implemented during the assembly process of the mobile communication terminal 101.

If the user desires that the old data stored in the memory unit 212 be moved to the data storage server 111 connected to the data communication network 103 in advance, the user selects the old data that the user desired to move to the data storage server 111 using the screen showing stored data list 321. The user then designates the data storage server 111 to which the user desires to move the selected old data using the screen for storage server setting 323. When the user selects "MOVE", the communication terminal is connected to the network, and the selected old data stored in the memory unit is uploaded to the designated data storage server 111 through the upstream channel.

Japanese Patent Laid-Open Application No. 2002-236641 discloses a system in which a mobile communication terminal requests a server to transmit content stored therein at a transmission speed via a data communication network, and the server transmits the requested content to the requesting mobile communication terminal at the requested transmission speed.

When the mobile communication terminal 101 of the communication system shown in FIG. 7 downloads new data, the mobile communication terminal 101 can move the old data stored in the memory unit 212 to the data storage server 111 connected to the data communication network 103 before starting the download of the new data thereby to secure the memory capacity for the new data to be downloaded. If the amount of the new data to be downloaded is not known, it may be difficult to secure the memory capacity of the memory unit 212 for the new data in advance. Additionally, in the case of a communication system in which the transmission speed of downstream channel is larger than that of upstream channel, it may be not possible to move the old data to the data storage server after starting the download of new data. The remaining memory capacity of the memory unit keeps being reduced, and the download of new data may be suspended.

In the case of the system described above in which a mobile communication terminal designates transmission speed, if the mobile communication terminal can not check the remaining memory capacity of the memory unit in which downloaded new data is stored, it may be practically difficult to secure the remaining memory capacity by uploading the old data to the data storage server.

SUMMARY OF THE INVENTION

Accordingly, it is a general object of the present invention to provide novel and useful data communication in which one or more of the problems described above are eliminated.

Another and more specific object of the present invention is to provide a data communication system in which, even if the user does not know the remaining memory capacity of the memory unit, the mobile communication terminal can store the downloaded new data.

To achieve at least one of the above objects, a communication system according to an aspect of the present invention, includes:

a network in which the transmission speeds of a upstream channel and a downstream channel for transmitting data can be changed independently;

a data storage server connected to the network, the data storage server configured to store data uploaded thereto via the network; and a communication terminal connected to the network, the communication terminal configured to upload old data stored therein to the data storage server via the network thereby to move the old data to the data storage server, and download new data via the network thereby to store the new data therein, wherein the communication terminal is further configured to request the network to change at least one of the transmission speeds of the upstream channel and the downstream channel based on remaining memory capacity thereof and the transmission speeds such that there remains memory capacity available for the new data.

According to the above arrangements, the data communication system in which the transmission speeds of a upstream channel and a downstream channel can be changed independently can move stored old data and store downloaded new data concurrently. The data communication system can prevent the download of the new data from being suspended due to the lack of remaining memory capacity of the memory unit.

According to another aspect of the present invention, a communication terminal includes:

a transceiver configured to download and upload data via a network;

a memory configured to store data downloaded via the transceiver;

a memory capacity check unit configured to check the memory capacity of the memory;

a transmission speed management unit configured to manage the memory capacity of the memory checked by the memory capacity check unit and the transmission speeds of a upstream channel and a downstream channel; and a control unit configured to determine whether to change at least one of the transmission speeds of the upstream channel and the downstream channel, and request the network to change the at least one of the transmission speeds if a determination to change the at least one of the transmission speeds is made such that there remains memory capacity in the memory available for the new data.

According to the above arrangements, the control unit of the communication terminal can request the network to change at least one of the transmission speeds of the upstream channel and the downstream channel based on remaining memory capacity checked by the memory capacity check unit and the transmission speeds managed by the transmission speed management unit such that there remains memory capacity available for the new data.

Other objects, features, and advantages of the present invention will be more apparent from the following detailed description when read in conjunction with the accompanying drawings.

DETAILED DESCRIPTION OF THE PREFERRED EMBODIMENTS

The preferred embodiment of the present invention are described below with reference to the drawings.

A data communication system according to an embodiment of the present invention includes a network, a data storage server, and a communication terminal. The data storage server and the communication terminal are communicatively connected to the network.

In the network, the transmission speed of a upstream channel in which the communication terminal uploads (sends) data to the data storage server and the transmission speed of a downstream channel in which the communication terminal downloads (receives) data from a data distribution server, for example, can be changed independently.

The data storage server can receive data uploaded through the upstream channel in the network by the communication terminal, and store the received data.

The communication terminal can downloads data from the data distribution server, for example, through the downstream channel in the network and store the received data. When downloading new data from the data distribution server through the downstream channel in the network, the communication terminal uploads the old data stored therein to the data storage server through the upstream channel in the network. The uploaded old data is stored in the data storage server as described above. When the communication terminal uploads the old data through the upstream channel and down-load new data through downstream channel, the communication terminal can request the network to change at least one of the transmission speed of the upstream channel and the transmission speed of the downstream channel based on remaining memory capacity of the communication terminal and the transmission speeds. The communication terminal can store the downloaded new data while uploading the old data such that there remains memory capacity available for the downloaded new data without overwriting the old data with the new data and interrupting the download of the new data for preventing the new data from overflowing.

A communication terminal according to an embodiment of the present invention includes a transceiver, a memory, a memory capacity check unit, a transmission speed management unit, and a control unit. The communication terminal can download and upload data through the transceiver via the upstream channel and the downstream channel, respectively, in the network. The memory can store data downloaded through the downstream channel and the transceiver.

The memory capacity check unit can check the available memory capacity for new data to be downloaded through the downstream channel and the transceiver.

The transmission speed management unit can manage the memory capacity checked by the memory capacity check unit, the transmission speed of the upstream channel of the network, and the transmission speed of the downstream channel of the network.

The control unit can determine whether to change the transmission speed of the upstream channel and/or the transmission speed of the downstream channel based on the remaining memory capacity checked by the memory capacity check unit and the transmission speed of the upstream channel and the transmission speed of the downstream channel managed by the transmission speed management unit. The control unit further can request the network to change the transmission speed of the upstream channel and/or the transmission speed of the downstream channel if a determination to change the transmission speeds is made such that there remains memory capacity available for the new data to be downloaded. The communication terminal is described in detail below with reference to FIG. 1.

Figure 1:
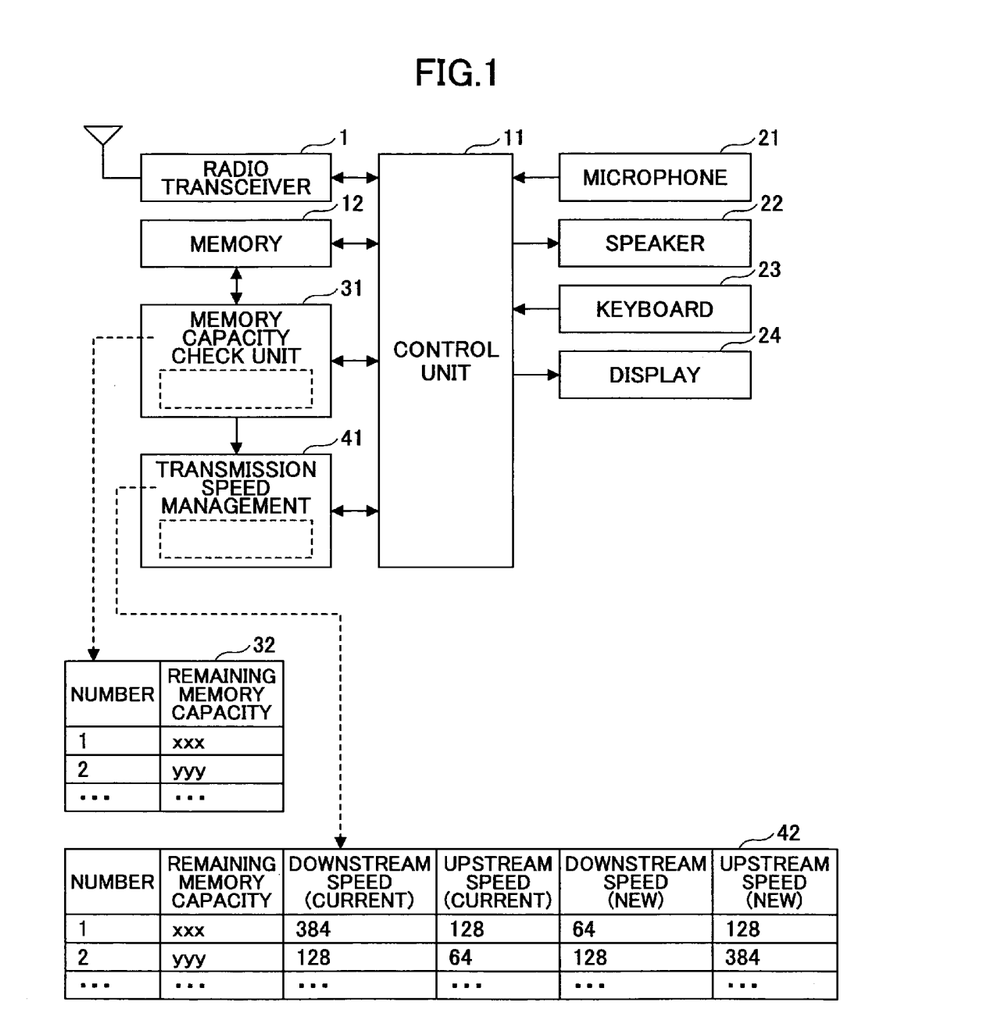
FIG. 1 is a block diagram showing a mobile communication terminal according to an embodiment of the present invention.

FIG. 1 is a block diagram showing a mobile communication terminal according to an embodiment of the present invention. The communication terminal shown in FIG. 1 includes a radio transceiver 1, a control unit 11, a memory unit 12, a microphone 21, a speaker 22, a keyboard 23, a display unit 24, a memory capacity check unit 31, and a transmission speed management unit 41. The memory capacity check unit 31 includes a check table 32 indicating the remaining memory capacity. The transmission speed management unit 41 includes a management table indicating the current and new transmission speeds of the downstream channel and the upstream channel for each remaining memory capacity. If the transmission speeds are to be changed, the transmission speeds of the down stream channel and the upstream channel can be selected based on the management table.

The higher the transmission speed of the downstream channel is, the faster the remaining memory capacity of the memory unit 12 is reduced. When the remaining memory capacity of the memory unit 12 becomes equal to or less than a threshold based on the check table 32, the memory capacity check unit 31 sends a notice to the transmission speed management unit 41. If the transmission speed of the downstream channel is high, the threshold is set at a high value.

Figure 2:
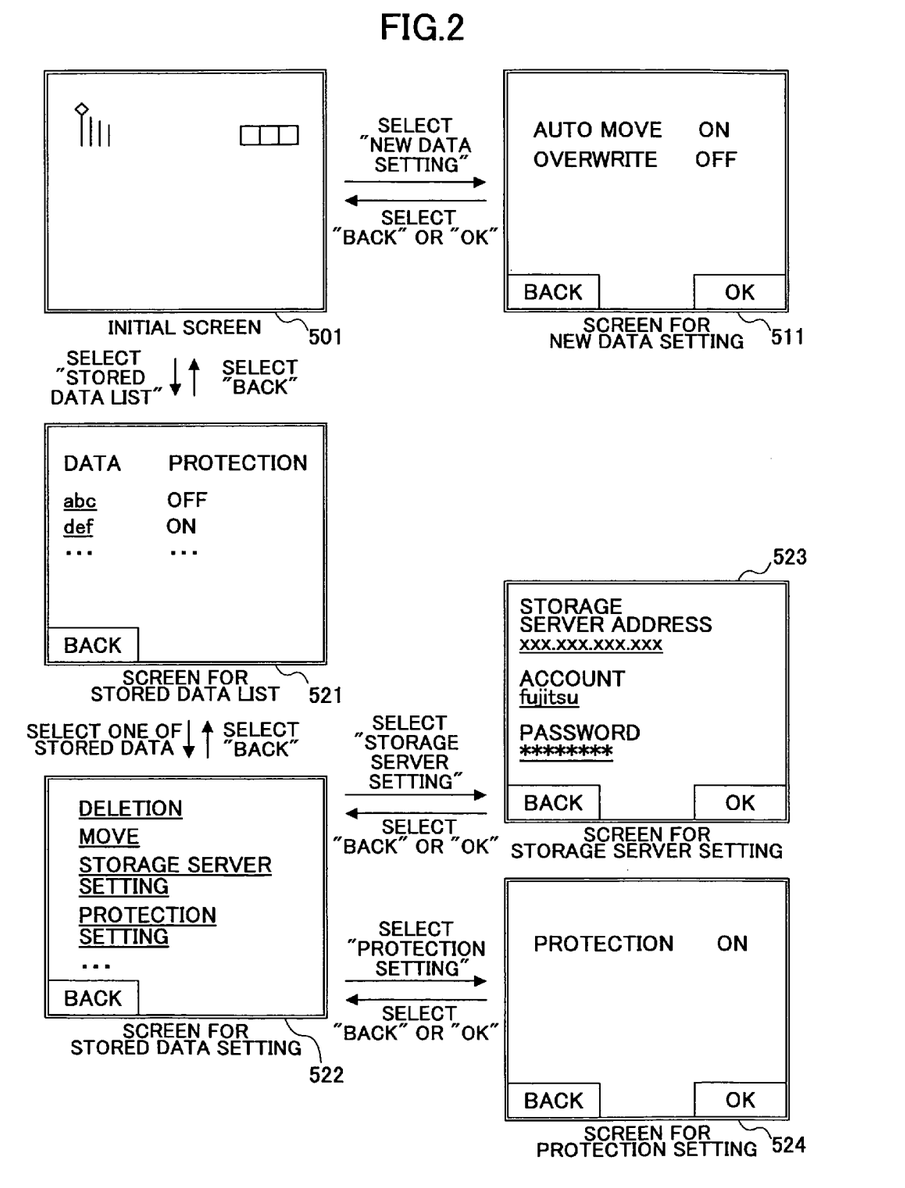
FIG. 2 is a schematic diagram showing the transition of screens of a mobile communication terminal according to an embodiment.

FIG. 2 is a schematic diagram for explaining the transition of screens shown on the display unit 24 (FIG. 1), according to an embodiment. The display unit 24 of the communication terminal shows an initial screen 501 in the initial state. When "NEW DATA SETTING" is selected using the keyboard 22, for example, a screen for new data setting 511 is shown. Through the screen for new data setting 511, a user can set whether, when the remaining memory capacity of the memory unit 12 becomes insufficient while new data is downloaded and stored, the old data already stored in the memory 12 is to be automatically moved to a data storage server in the network, for example. The user can further set whether the old data is to be overwritten continuing the storing of the new data.

If the user sets "AUTO MOVE" ON, which means the old data is to be automatically moved to the data storage server, it is generally not necessary for the user to set "OVERWRITE" OFF, which means that the old data stored in the memory 12 is not overwritten by the new data downloaded through the downstream channel. However, if the stored old data cannot be moved to the data storage server for some reasons, the setting of "OVERWRITE" is needed.

According to the present embodiment, the move of the stored old data to the data storage server can be performed automatically. However, according to another embodiment, the move of the stored old data to the data storage server may be performed manually by the user. The settings can be stored in the memory unit 12. The stored old data may be moved to any storage unit capable of storing data.

The screen for stored data list 521, the screen for stored data setting 522, the screen for storage server setting 523, and the screen for protection setting 524 are the same as those shown in FIG. 9 as the related art. When moving the old data stored in the memory unit 12 to the data storage server, the user can select one or more items of the old data and set their protection on or off using the screen for stored data list 521. The user further designate the data storage server to which the old data stored in the communication terminal is to be moved by inputting the address (IP address for example) of the data storage server, account name, and password, for example, using the screen for storage server setting 523. When "MOVE" is selected in the screen for stored data setting 522, the communication terminal is connected to the network and the selected items of the old data are uploaded to the designated data storage server 111 via a upstream channel. The user can determine whether a particular item of the old data is to be moved to the data storage server or not using the screen for protection setting 524.

Figure 3:
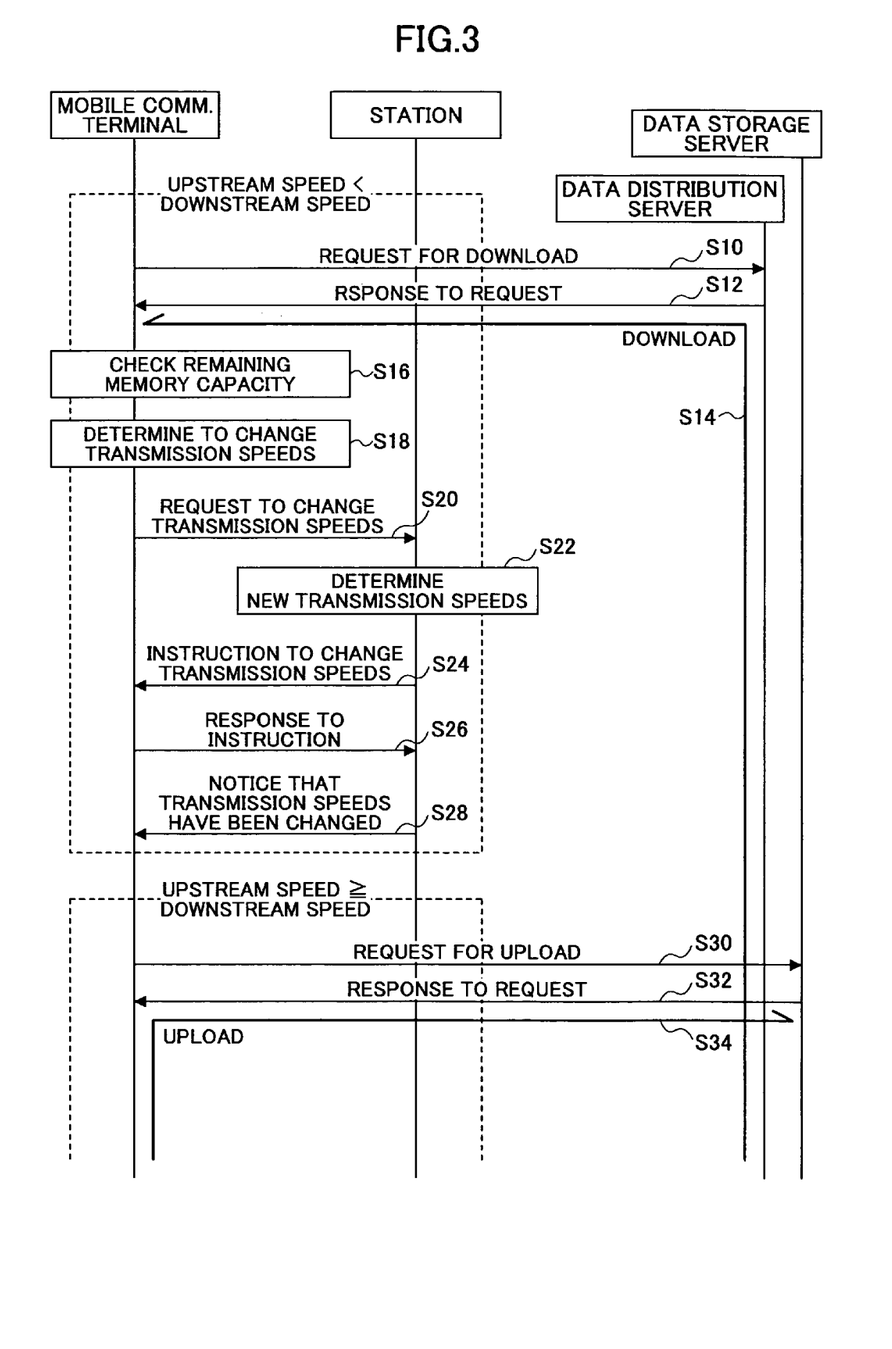
FIG. 3 is a sequence chart for explaining the procedure of data communication according to an embodiment.

FIG. 3 is a sequence diagram for explaining procedure among the mobile communication terminal, the station, the data distribution server, and the data storage server. The mobile communication terminal corresponds to the mobile communication terminal 101. The station corresponds to the station 102 connected to the data communication network 103 and the voice communication network 104. The data distribution server and the data storage server correspond to the data distribution server 112 and the data storage server 111, respectively.

As described above, when downloading new data from the data distribution server, for example, via the downstream channel, the old data stored in the communication terminal can be moved to the data storage server via the upstream channel. The user sets "AUTO MOVE" ON for the old data to be moved to the data storage server using the screen for new data setting 511 (FIG. 2), and designates the data storage server in which the old data is stored. The step of inputting the account name and the password for the designated server may be provided. One or more items of the old data may be set as data that is not moved to the data storage server, but still protected in the communication terminal.

Then, the user operates the mobile communication terminal to download new data from the data distribution server. In response to the user's operation, the mobile communication terminal is connected to the data distribution server via the station and the data communication network. In the data communication network, the transmission speed of the upstream channel and the transmission speed of the downstream channel can be selected independently. As shown in FIG. 3, the transmission speed of the upstream channel may be initially lower than that of the downstream channel. The mobile communication terminal sends a request for download to the data distribution server (step S10), and in response to receipt of the request, the data distribution server returns the response to the request (step S12). The download of the new data starts via the downstream channel, and the new data is stored in the communication terminal (step S14). The data distribution server may include information of the amount of new data to be downloaded in the response to the request.

In the communication terminal, the memory capacity check unit 31 (FIG. 1) can check the remaining memory capacity of the memory unit 12 (step S16), and the transmission speed management unit 41 or the control unit 11 can determine whether the transmission speeds of the upstream channel and/or the downstream channel need to be changed (step S18). If the remaining memory capacity of the memory unit 12 is reduced to a threshold value or less, the communication terminal determines that the transmission speeds of the channels need to be changed. Thus, if the transmission speeds of the channels need to be changed, the communication terminal sends a request to change transmission speeds to the station via the radio transceiver 1 (step S20). According to the present embodiment, the communication terminal does not include any specific transmission speed that the communication terminal requests. In response to receipt of the request, the station determines a new set of transmission speeds of the channels by changing the transmission speed of the upstream channel, the transmission speed of the downstream channel, or both, such that the transmission speed of the upstream channel becomes equal to or more than that of the downstream channel (step S22). The station sends an instruction to change transmission speeds including the information of the determined transmission speeds to the communication terminal (step S24).

In response to receipt of the instruction from the station, the communication terminal sends the response to the instruction (step S26). In response to receipt of the response to the instruction, the station changes the transmission speeds, and sends a notice that transmission speeds have been changed (step S28). As a result, the transmission speed of the upstream channel becomes equal to or more than that of the downstream channel. The communication terminal sends a request for upload of the old data stored in the memory unit 12 to the data storage server, for example (step S30). In response to receipt of the response to the request from the data storage server (step S32), the communication terminal starts uploading the old data (step S34). Since the transmission speed of uploading the old data is set equal to or more than that of downloading the new data, the remaining memory capacity of the memory unit 12 in which the downloaded new data is to be stored is not reduced. The communication terminal does not need to suspend the download of the new data. The old data to be uploaded to the data storage server and the old data on which the downloaded new data can overwrite can be designated by the user using the screens shown in FIG. 2.

Figure 4:
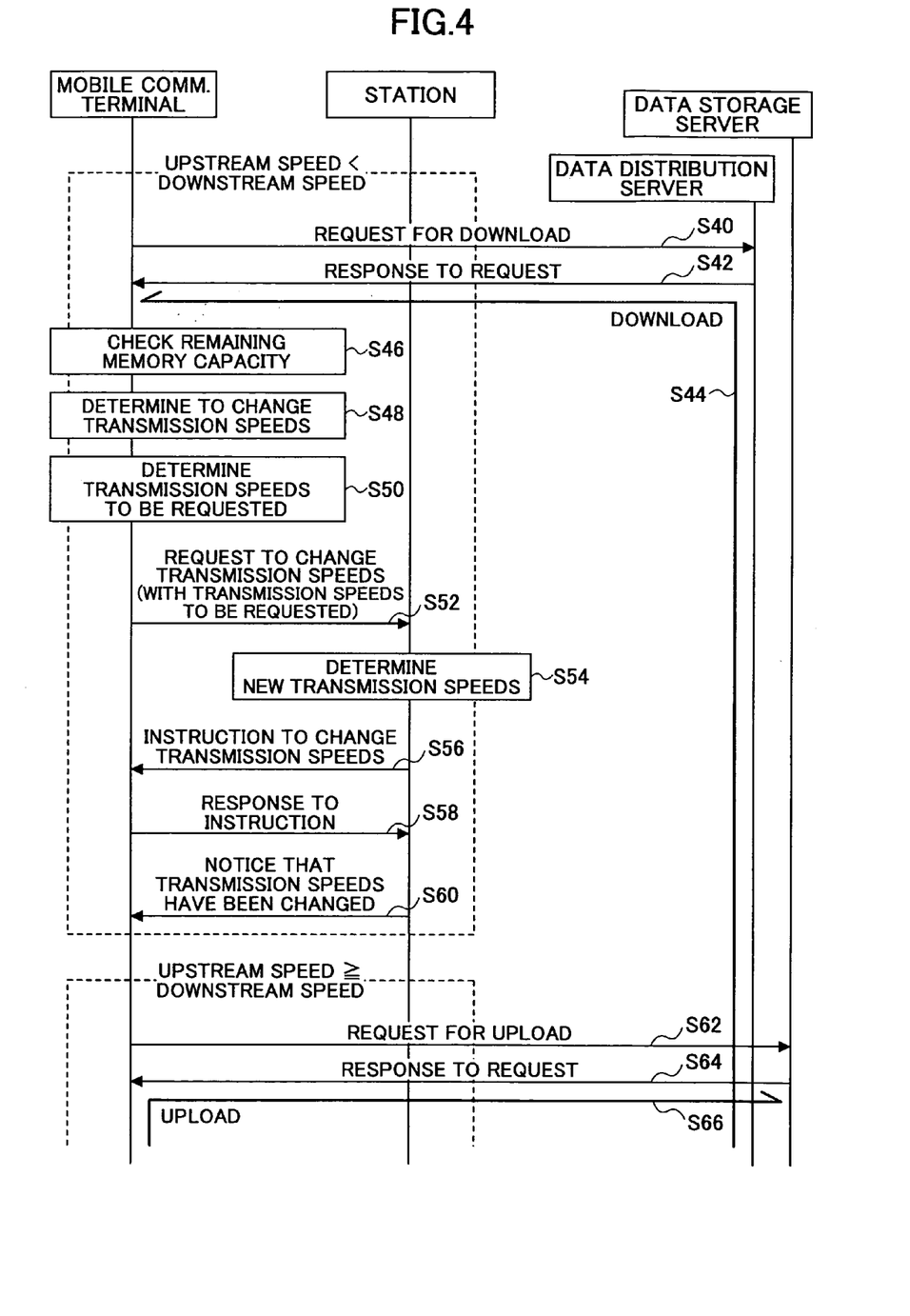
FIG. 4 is a sequence chart for explaining the procedure of data communication according to another embodiment.

FIG. 4 is a sequence diagram for explaining procedure according to a second embodiment of the present invention. Since steps S40 through S48 are identical to steps S10 through S18 of FIG. 3, their description is omitted. The procedure according to the second embodiment is different from that of the first embodiment in that the communication terminal determines the transmission speed to be requested (step S50) and, when the communication terminal sends a request to change the transmission speeds to the station, the communication terminal includes information about the transmission speeds to be requested (step S52). The transmission speeds to be requested can be determined based on the relation between the remaining memory capacity and the current transmission speeds obtained from the management table 42 of the transmission speed management unit 41. The station determines whether the requested transmission speeds included in the request to change the transmission speeds is feasible. If feasible, the station determines the requested transmission speeds as a new set of the transmission speeds (step S54). The station sends an instruction to change the transmission speeds (step S56). In response to receipt of the instruction, the communication terminal sends the response to the instruction (step S58). In response to receipt of the response to the instruction, the station changes the transmission speeds, and sends a notice that transmission speeds have been changed (step S60). As a result, the transmission speed of the upstream channel becomes equal to or more than that of the downstream channel.

The communication terminal sends a request for upload of the old data stored in the memory unit 12 to the data storage server, for example (step S62). In response to receipt of the response to the request from the data storage server (step S64), the communication terminal starts uploading the old data (step S66). Since the transmission speed of uploading the old data is set equal to or more than that of downloading the new data, the remaining memory capacity of the memory unit 12 in which the downloaded new data is stored is not reduced. The communication terminal does not need to suspend the download of the new data.

Figure 5:
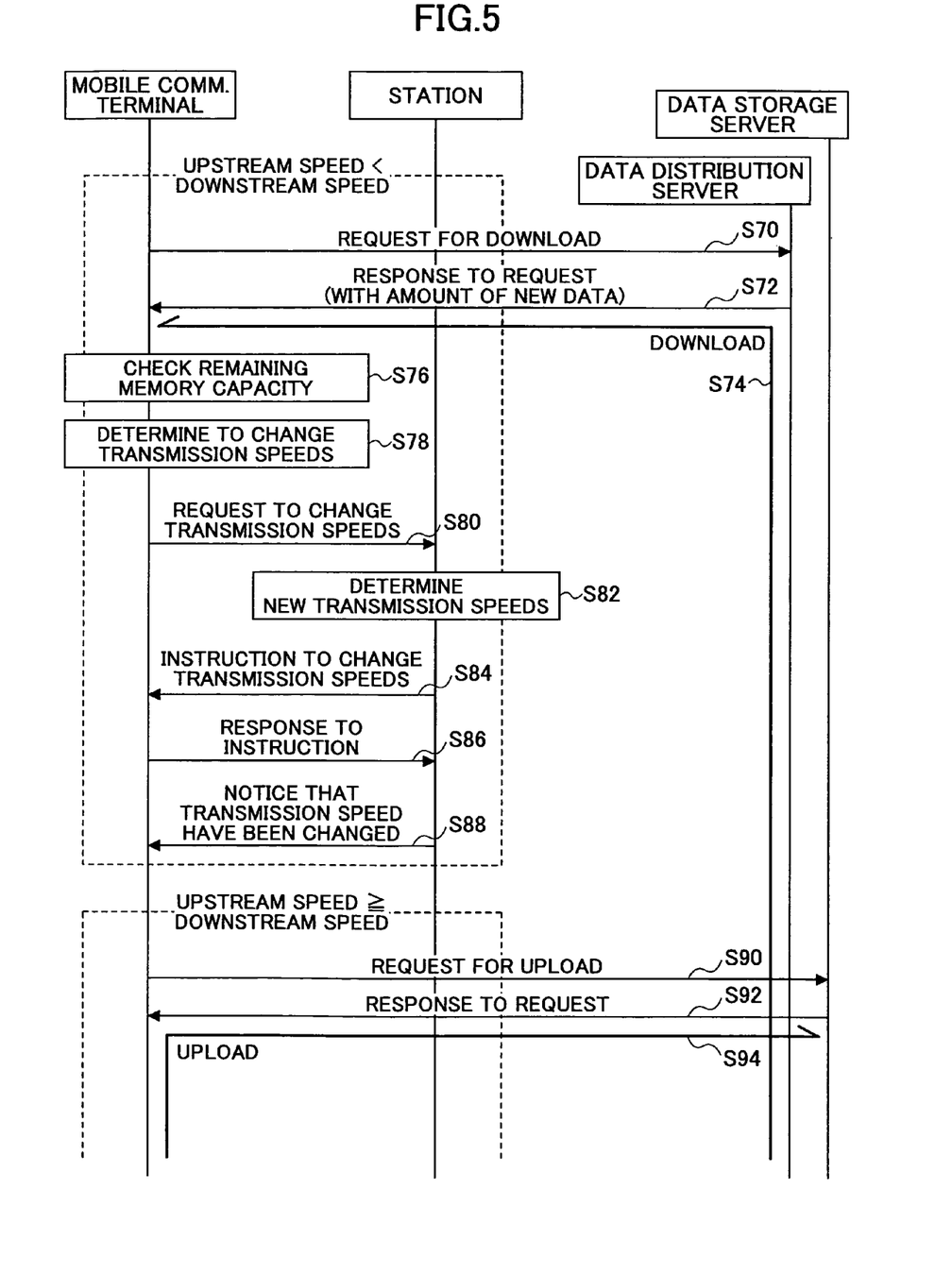
FIG. 5 is a sequence chart for explaining the procedure of data communication according to yet another embodiment.

FIG. 5 is a sequence diagram for explaining procedure according to a third embodiment of the present invention. The procedure according to the third embodiment is different from those of the first and second embodiments in that, in response to receipt of a request for download (step S70), the data distribution server sends information about the amount of new data to be downloaded with the response to the request (step S72). Since the communication terminal can know the amount of the new data to be downloaded, the transmission speed management unit 41 (FIG. 1) can determine whether the memory capacity is insufficient and exhausted while the new data is being downloaded. The communication terminal starts downloading new data (step S74).

If the communication terminal checks the remaining memory capacity of the memory unit (step S76) and further determines that the memory capacity is being exhausted while the new data is downloaded (step S78), the communication terminal sends a request to check transmission speeds to the station connected to the network (step S80). The station determines new transmission speeds that can be allocated to the communication terminal based on the current transmission speeds that are controlled by the station (step S82). The station sends an instruction to change transmission speeds indicating the allocated new transmission speeds to the communication terminal (step S84). The communication terminal sends the response to the instruction to the station (step S86). In response to receipt of the response, the station changes the transmission speeds, and sends a notice that transmission speeds have been changed to the allocated new transmission speeds to the communication terminal (step S88). In response to receipt of the notice, the communication terminal sends a request for upload to the data storage server connected to the network (step S90). In response to receipt of the request for upload, the data storage server sends the response to the request (step S92). In response to receipt of the response, the communication terminal starts uploading the old data stored in the memory unit 12 (step S94). According to the above arrangements, the communication terminal can secure memory capacity in the memory unit 12 for the new data to be downloaded from the data distribution server.

Figure 6:
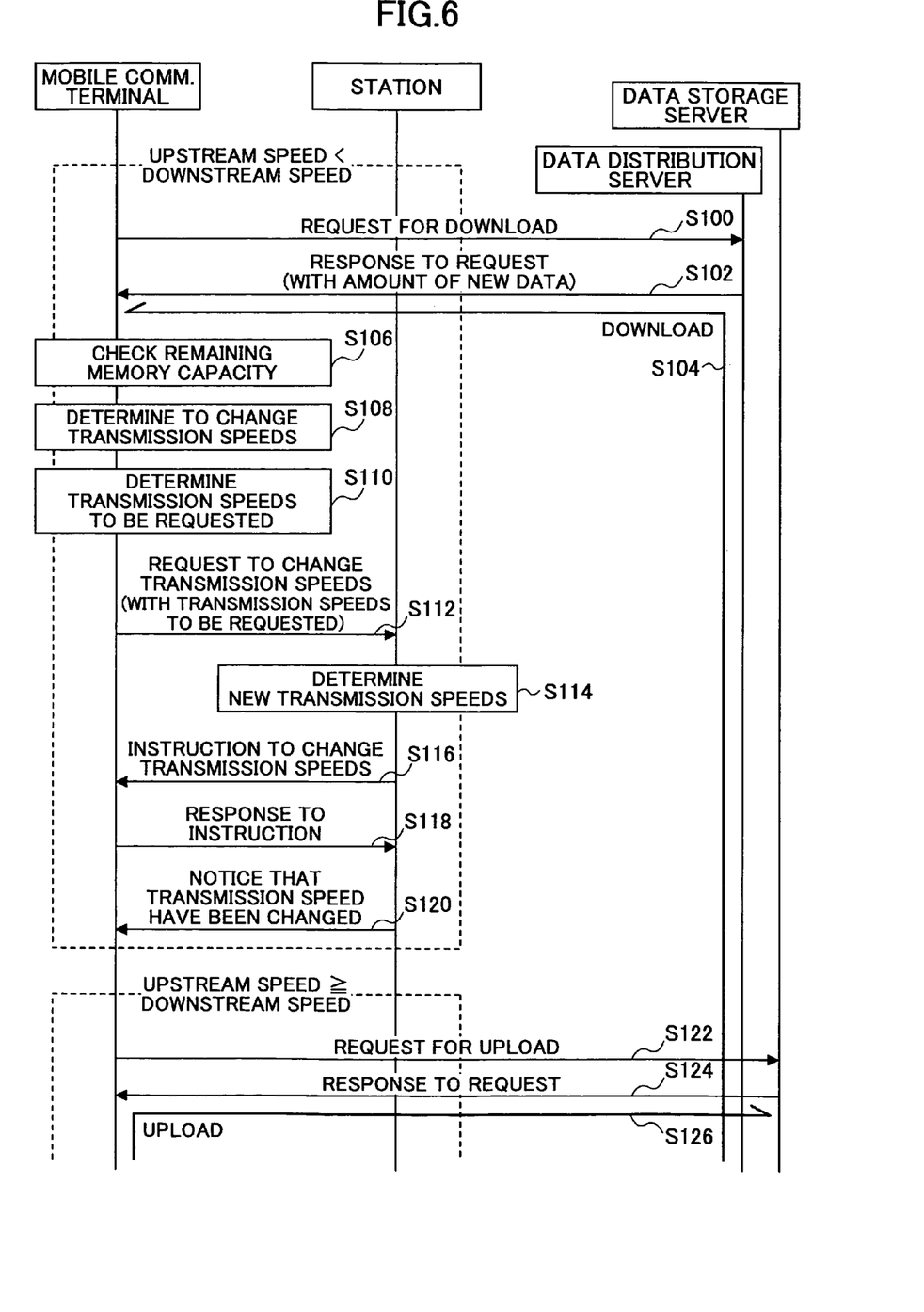
FIG. 6 is a sequence chart for explaining the procedure of data communication according to yet another embodiment.

FIG. 6 is a sequence diagram for explaining procedure according to a fourth embodiment of the present invention. The procedure according to the fourth embodiment is a combination of the procedures according to the second and third embodiments. In response to a request for download from the communication terminal (step S100), the data storage server sends information about the amount of new data to be downloaded as well as the acknowledge to the request to the communication terminal (step S102). During the process of downloading new data from the data distribution server (step S104), the memory capacity check unit 31 checks the remaining memory capacity of the memory unit 12, and the transmission speed management unit 41 manages the management table 42 (step S106). The transmission speed management unit 41 or the control unit 22 of the communication terminal determines whether the transmission speeds need to be changed (step S108). If the communication terminal determines that the transmission speeds need to be changed, the communication terminal determines the transmission speeds to be requested (step S110) and, when sending a request to change the transmission speeds to the station, the communication terminal includes information about the transmission speeds to be requested (step S112). The transmission speeds to be requested can be determined based on the amount of new data to be downloaded, the remaining memory capacity and the current transmission speeds obtained from the management table 42 of the transmission speed management unit 41.

The station determines whether the requested transmission speeds included in the request to change the transmission speeds is feasible. If not feasible, the station sends a notice that the request for changing the transmission speeds is not possible. If the transmission speeds can be changed as requested by the communication terminal, the station determines the requested transmission speeds as a new set of the transmission speeds (step S114). The station sends an instruction to change the transmission speeds (step S116). In response to receipt of the instruction, the communication terminal sends the response to the instruction (step S118). In response to receipt of the response, the station changes the transmission speeds, and sends a notice that transmission speeds have been changed (step S120). As a result, the transmission speed of the upstream channel becomes equal to or more than that of the downstream channel.

The communication terminal sends a request for upload to the data storage server connected to the network in response to receipt of the notice that the transmission speeds have been changed (step S122). The data storage server sends the response to the request for upload to the communication terminal (step S124). In response to receipt of the response from the data storage server, the communication terminal starts uploading the old data stored in the memory unit 12 thereby to save the old data in the data storage server (step S126). According to the above arrangements, the communication terminal can secure the memory capacity of the memory unit 12 in which the new data downloaded from the data distribution server is stored.

The messages defined by the 3rd Generation Partnership Project (3GPP) such as "Modify PDP Context Request", "Radio Bearer/Transport Channel/Physical Channel Reconfiguration", "Radio Bearer/Transport Channel/Physical Channel Reconfiguration Complete", and "Modify PDP Context Accept" may be used for the request to change transmission speeds, the instruction to change transmission speeds, the response to the instruction, and the notice that transmission speeds have been changed, for example.

Those skilled in the art easily understand that the present invention is also applicable to a data communication system in which a communication terminal is connected to a data communication network via a wired channel. Old data stored in the memory unit of the communication terminal may be moved to any data storage apparatus connected to the network other than the data storage server. The communication terminal may sends the request to change the transmission speeds not only to the station but also to the data distribution server connected to the network.

The present invention is not limited to these embodiments, but various variations and modifications may be made without departing from the scope of the present invention.

This patent application is based on Japanese Priority Patent Application No. 2004-350638 filed on Dec. 3, 2004, the entire contents of which are hereby incorporated by reference.

What is claimed is:

1. A data communication system, comprising:
a mobile terminal to start downloading first data to be downloaded from a distribution server for storing the downloaded first data in a memory of the mobile terminal, to check remaining memory capacity of the memory, and to start uploading second data stored in the memory for saving the second data in a data storage server; and
a base station provided between the mobile terminal and the data storage server,
wherein
the mobile terminal requests the base station to change transmission speeds of an upload channel for the second data and a download channel for the first data between the mobile terminal and the base station such that there remains memory capacity available in the memory for the downloaded first data based on remaining memory capacity of the memory and the transmission speeds of the upload channel to the base station and the download channel from the base station,
wherein the mobile terminal comprises a management table containing the remaining memory capacity of the memory, a current transmission speed, and a new transmission speed to be requested to the base station; and is further configured to determine at least one of the transmission speeds of the upload channel and the download channel based on the remaining capacity of the memory and the transmission speeds, and request the base station to use the determined at least one of the transmission speeds.

2. A data communication system, comprising:
a mobile terminal to start downloading first data to be downloaded from a distribution server for storing the downloaded first data in a memory of the mobile terminal, to check remaining memory capacity of the memory, and to start uploading second data stored in the memory for saving the second data in a data storage server; and
a base station provided between the mobile terminal and the data storage server,
wherein
the mobile terminal requests the base station to change transmission speeds of an upload channel for the second data and a download channel for the first data between the mobile terminal and the base station such that there remains memory capacity available in the memory for the downloaded first data based on remaining memory capacity of the memory and the transmission speeds of the upload channel to the base station and the download channel from the base station,
wherein the mobile terminal is informed of the amount of the data to be downloaded, and comprises a management table containing the memory capacity of the memory, a current transmission speed, and a transmission speed to be requested of the base station, and is further configured to request the base station to change at least one of the transmission speeds based on the remaining capacity of the memory, the informed amount of the data to be downloaded, and the transmission speeds.

3. A mobile terminal, comprising:
a transceiver to download data from a distribution server via a base station and upload data to a storage server via the base station;
a memory to store data;
a memory capacity check unit to check remaining memory capacity of the memory;
a transmission speed management unit configured to manage transmission speed of an upload channel for second data or transmission speed for the download channel between the mobile terminal and the base station; and
a control unit to start downloading first data to be downloaded from the distribution server and to start uploading second data stored in the memory for saving the second data in the data storage server, the uploading and downloading being performed in parallel via the base station, and to request the base station to change the transmission speeds of the upload channel for the second data and the download channel for the first data such that there remains memory capacity available in the memory for the downloaded first data based on remaining memory capacity of the memory checked by the memory capacity check unit and the transmission speeds of the upload channel to the base station and the download channel from the base station,
wherein
the transmission speed management unit comprises a management table containing the remaining memory capacity of the memory, a current transmission speed, and a new transmission speed to be requested to the base station; and
the control unit is further configured to request the base station to change the transmission speeds of the upload channel and the download channel based on the management table.

4. The mobile terminal as claimed in claim 3, wherein the control unit is further configured to determine at least one of the transmission speeds of the upload channel and the download channel based on the remaining capacity of the memory and the transmission speeds, and request the base station to use the determined at least one of the transmission speeds.

5. The mobile terminal as claimed in claim 3, wherein the mobile terminal is informed of the amount of the data to be downloaded, and is further configured to request the base station to change at least one of the transmission speeds based on the remaining capacity of the memory, the informed amount of the data to be downloaded, and the transmission speeds.

6. A mobile terminal, comprising:
a transceiver to download data from a distribution server via a base station and upload data to a storage server via the base station;
a memory to store data;
a memory capacity check unit to check remaining memory capacity of the memory;
a transmission speed management unit configured to manage transmission speed of an upload channel for second data or transmission speed for the download channel between the mobile terminal and the base station; and
a control unit to start downloading first data to be downloaded from the distribution server and to start uploading second data stored in the memory for saving the second data in the data storage server, the uploading and downloading being performed in parallel via the base station, and to request the base station to change the transmission speeds of the upload channel for the second data and the download channel for the first data such that there remains memory capacity available in the memory for the downloaded first data based on remaining memory capacity of the memory checked by the memory capacity check unit and the transmission speeds of the upload channel to the base station and the download channel from the base station,
wherein
the transmission speed management unit comprises a management table containing the memory capacity of the memory, a current transmission speed, and a transmission speed to be requested of the base station; and
the control unit is further configured to request the base station to change the transmission speeds of the upload channel and the download channel based on the management table and the amount of data to be downloaded from the network.

* * * * *